(12) United States Patent
Williams et al.

(10) Patent No.: US 11,862,948 B2
(45) Date of Patent: Jan. 2, 2024

(54) FISH STICK ASSEMBLY WITH LIGHTED TIP

(71) Applicant: Milwaukee Electric Tool Corporation, Brookfield, WI (US)

(72) Inventors: Aaron M. Williams, Milwaukee, WI (US); Caleb C. Adams, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/575,191

(22) Filed: Jan. 13, 2022

(65) Prior Publication Data
US 2022/0140578 A1    May 5, 2022

Related U.S. Application Data

(63) Continuation of application No. 16/195,253, filed on Nov. 19, 2018, now Pat. No. 11,258,236, which is a
(Continued)

(51) Int. Cl.
*H02G 1/06*    (2006.01)
*F21V 9/30*    (2018.01)
(Continued)

(52) U.S. Cl.
CPC ............. *H02G 1/06* (2013.01); *B25G 1/04* (2013.01); *F21L 4/00* (2013.01); *F21V 5/04* (2013.01);
(Continued)

(58) Field of Classification Search
CPC .......... H02G 1/081; H02G 1/083; F21V 5/04; F21V 15/01; F21V 33/0084
See application file for complete search history.

(56) References Cited

U.S. PATENT DOCUMENTS 1,203,546 A   10/1919   Parsons
1,975,244 A   10/1934   Wiseman
(Continued)

FOREIGN PATENT DOCUMENTS

CN   100454704 C   1/2009
CN   201836784 U   5/2011
(Continued)

OTHER PUBLICATIONS

Zhang Yan et al., Medical Physics, China Medical Science Press, Aug. 31, 2016, pp. 145-146.
(Continued)

*Primary Examiner* — Tracie Y Green
*Assistant Examiner* — Michael Chiang
(74) *Attorney, Agent, or Firm* — Reinhart Boerner Van Deuren s.c.

(57) ABSTRACT

A fish stick includes a light emitting component, such as a lighted tip, near the leading end of the fish stick. The lighted tip includes a curved lens that directs some light around an attachment piece at the end of the fish stick and generally in the forward direction parallel to the longitudinal axis of the fish stick. The fish stick may be made of a phosphorescent material and stored in a lit container with an LED and reflective surfaces. The fish stick may be made of multiple rods that are threadably engaged with each other and include a spring biasing element that increases the coefficient of friction between the threads of the rods. The fish stick may also be made of multiple rods that are threadably engaged with each other via collars.

20 Claims, 16 Drawing Sheets

Related U.S. Application Data continuation of application No. PCT/US2018/060254, filed on Nov. 12, 2018.

(60) Provisional application No. 62/670,263, filed on May 11, 2018, provisional application No. 62/608,353, filed on Dec. 20, 2017, provisional application No. 62/584,288, filed on Nov. 10, 2017.

(51) Int. Cl.
  B25G 1/04     (2006.01)
  F21V 5/04     (2006.01)
  F21V 15/01    (2006.01)
  F21V 33/00    (2006.01)
  H02G 1/08     (2006.01)
  F21L 4/00     (2006.01)
  F21Y 115/10   (2016.01)

(52) U.S. Cl.
  CPC ........... *F21V 9/30* (2018.02); *F21V 15/01* (2013.01); *F21V 33/0084* (2013.01); *H02G 1/083* (2013.01); *H02G 1/085* (2013.01); *F21Y 2115/10* (2016.08)

(56) References Cited

U.S. PATENT DOCUMENTS

| | | |
|---|---|---|
| 3,017,499 A | 1/1962 | Fore |
| 3,182,960 A | 5/1965 | French |
| 4,730,510 A | 3/1988 | Graham |
| 5,052,660 A | 10/1991 | Bergman |
| 5,098,216 A | 3/1992 | Caperton |
| 5,644,864 A | 7/1997 | Kelly |
| 5,820,249 A | 10/1998 | Walsten et al. |
| 5,938,180 A | 8/1999 | Walsten |
| 6,030,092 A * | 2/2000 | McCalla ............ B25B 23/18 362/120 |
| 6,279,877 B1 | 8/2001 | Davis |
| 6,668,751 B1 | 12/2003 | Henke |
| 7,216,847 B2 | 5/2007 | Bowen et al. |
| 7,749,160 B2 | 7/2010 | Hirata |
| 8,033,678 B2 | 10/2011 | Patterson |
| 8,157,409 B2 | 4/2012 | Sim |
| 8,302,939 B2 | 11/2012 | Kerfoot |
| 8,316,577 B2 | 11/2012 | Hale et al. |
| 8,544,822 B2 | 10/2013 | Forthman et al. |
| 8,973,900 B2 | 3/2015 | Forthman et al. |
| 9,062,834 B2 | 6/2015 | Rennecker |
| 9,726,844 B2 | 8/2017 | Forthman et al. |
| 2002/0014776 A1 | 2/2002 | Boulay |
| 2002/0053278 A1 | 5/2002 | Hayes et al. |
| 2004/0216355 A1 | 11/2004 | Gore |
| 2005/0155195 A1 | 7/2005 | Bowen et al. |
| 2007/0160327 A1 | 7/2007 | Lewallen et al. |
| 2007/0173695 A1 | 7/2007 | Hirata |
| 2007/0277424 A1 | 12/2007 | Hale et al. |
| 2008/0221482 A1 | 9/2008 | Mondry et al. |
| 2009/0257221 A1* | 10/2009 | Patterson ............. H02G 1/081 362/362 |
| 2010/0269397 A1 | 10/2010 | Hale et al. |
| 2011/0096539 A1* | 4/2011 | Sim .................... F21S 9/02 362/231 |
| 2011/0272651 A1 | 11/2011 | Forthman et al. |
| 2013/0155668 A1* | 6/2013 | Rennecker ........... H02G 1/083 362/191 |
| 2013/0319760 A1 | 12/2013 | Wang |
| 2014/0027690 A1 | 1/2014 | Forthman et al. |
| 2015/0016096 A1* | 1/2015 | Parson ................ B25F 5/02 362/109 |
| 2015/0153534 A1* | 6/2015 | Forthman ........... G02B 6/4466 362/551 |
| 2015/0334999 A1 | 11/2015 | Blakey |

FOREIGN PATENT DOCUMENTS

| | | |
|---|---|---|
| CN | 102318589 A | 1/2012 |
| CN | 202151083 U | 2/2012 |
| CN | 104335293 | 2/2015 |
| DE | 8805220 | 6/1988 |
| DE | 3813045 A1 | 11/1989 |
| EP | 1552588 B1 | 7/2005 |
| EP | 2770595 A1 | 8/2014 |
| TW | 201542968 A | 11/2015 |
| WO | WO 03107503 A1 | 12/2003 |
| WO | WO 06027400 | 3/2006 |
| WO | WO 15132388 | 9/2015 |

OTHER PUBLICATIONS

'Splinter Guard Fish and Glow Rods from Klein Tools' (Klein Tools), Apr. 9, 2013, [online], [retrieved from the internet on Sep. 25, 2020] <URL: https://www.youtube.com/watch?v=ZMWSpKTIbyQ> (Year: 2013) (Year: 2013).

International Search Report and Written Opinion for International Application No. PCT/US2018/060254 dated Mar. 4, 2019, 16 pages.

\* cited by examiner

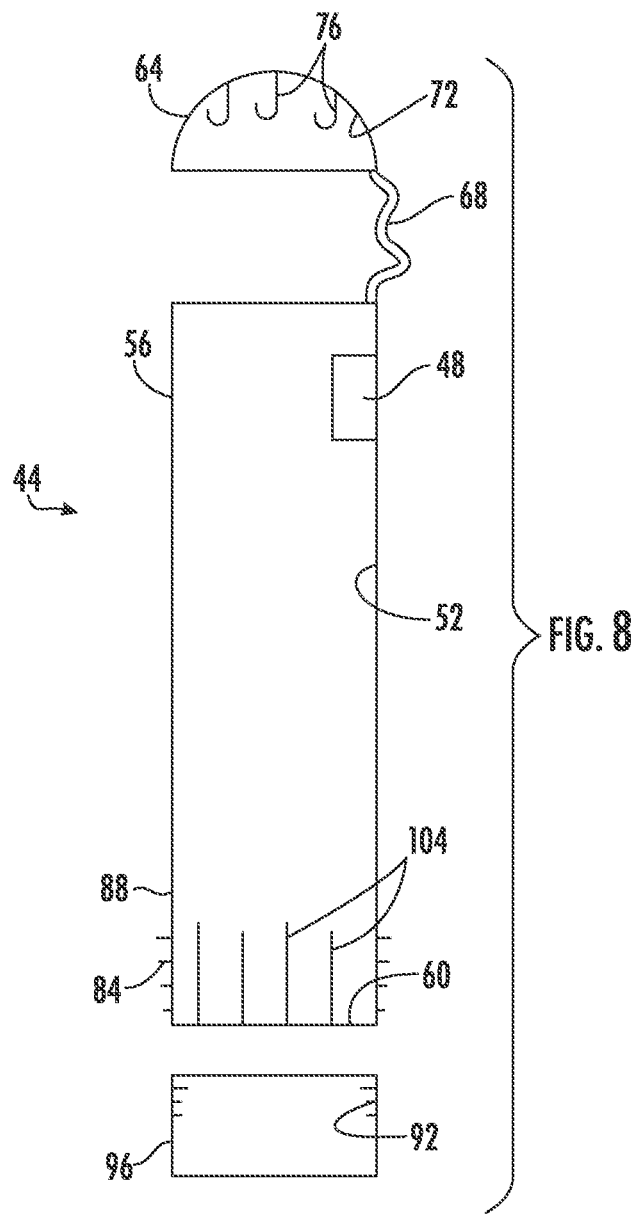
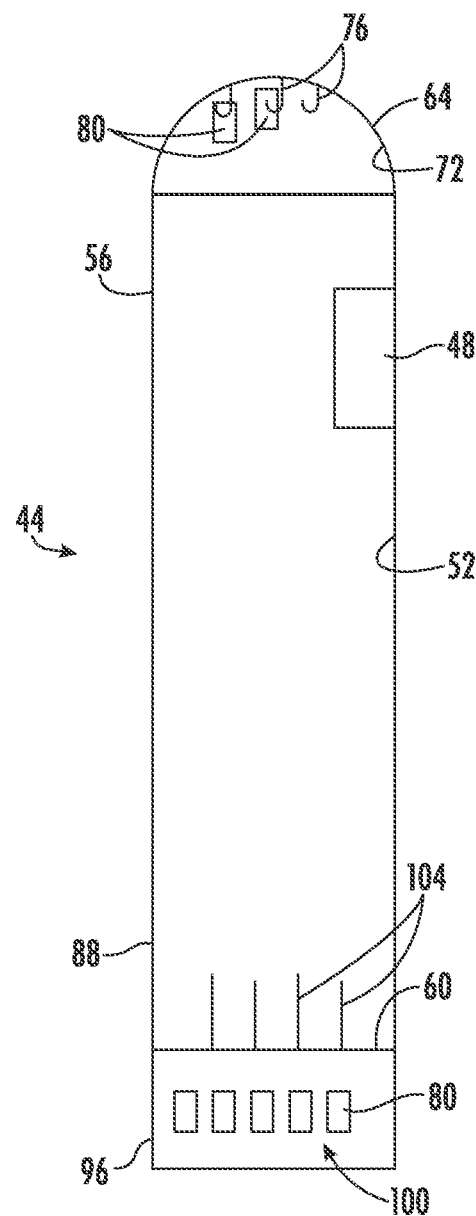

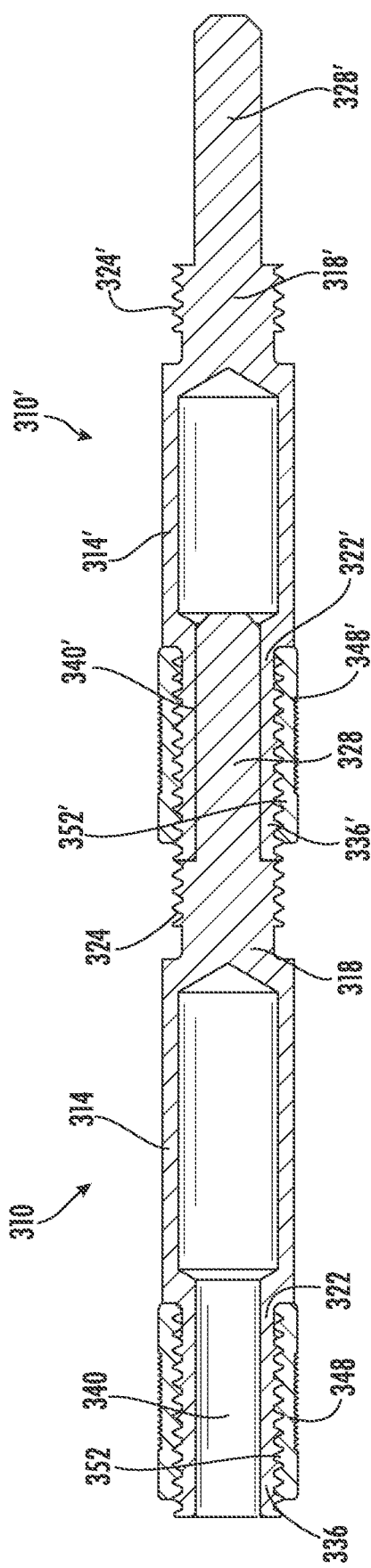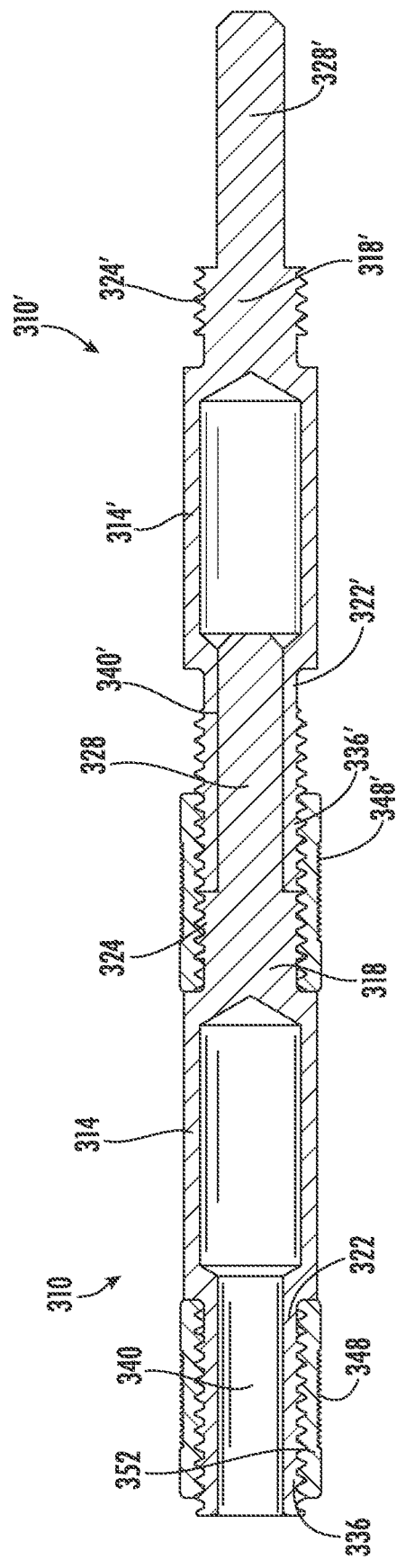

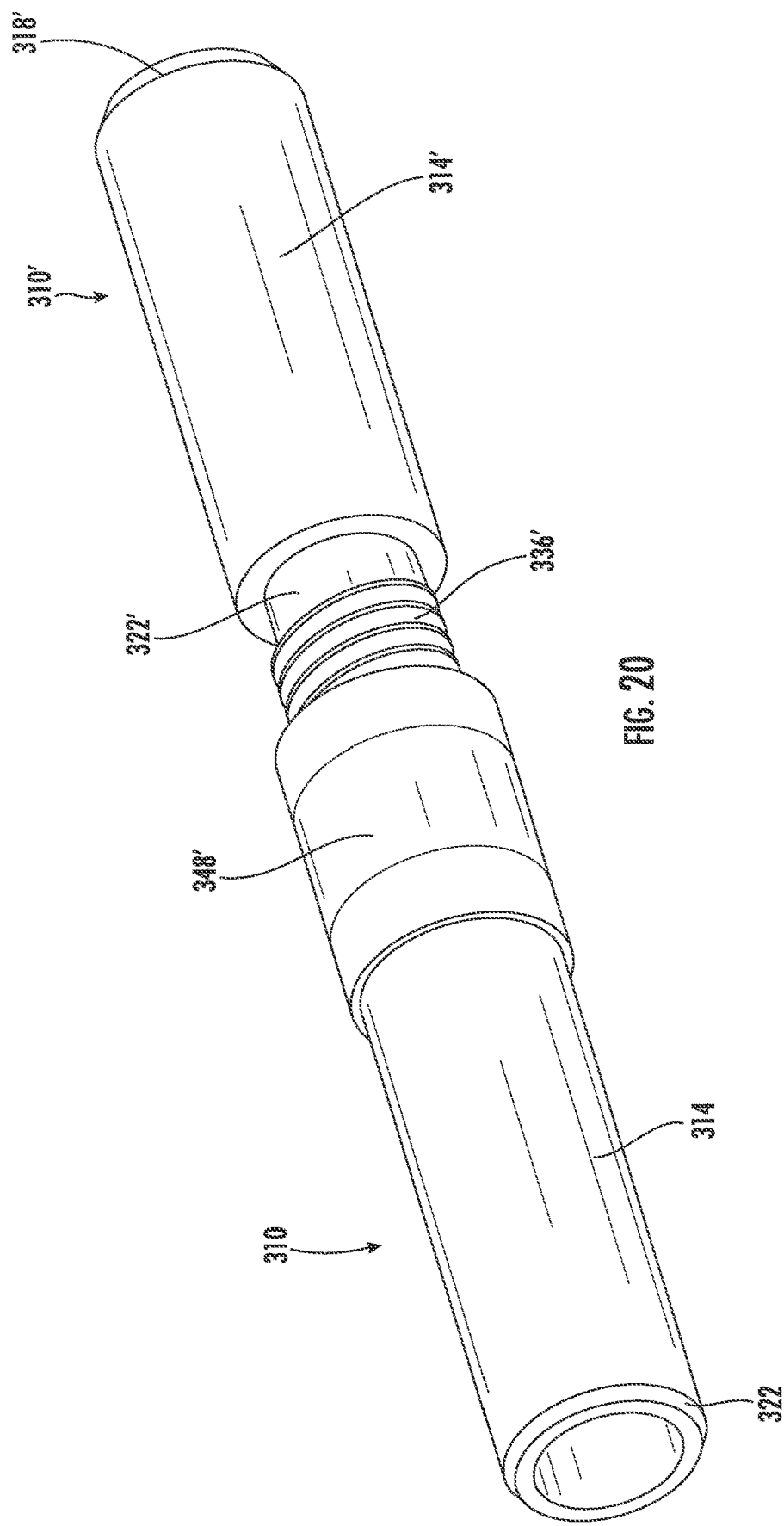

FISH STICK ASSEMBLY WITH LIGHTED TIP

CROSS-REFERENCE TO RELATED PATENT APPLICATION

This application is a continuation of U.S. application Ser. No. 16/195,253, filed Nov. 19, 2018, which is a continuation of International Application No. PCT/US2018/060254 filed Nov. 12, 2018, which claims priority to and the benefit of each of U.S. Provisional Application No. 62/584,288, filed Nov. 10, 2017, U.S. Provisional Application No. 62/608,353, filed Dec. 20, 2017, and U.S. Provisional Application No. 62/670,263, filed May 11, 2018, the contents of each of which are incorporated herein by reference in their entireties.

BACKGROUND OF THE INVENTION

Rods for pulling wires or cables behind walls, across ceilings, under carpets, etc. ("fish sticks"), typically include a plurality of elongated flexible rod segments coupled together at one or both ends by rigid connectors to achieve the length needed for a particular application. The connectors often include male and female threaded portions configured to screw together to secure two rod segments together. When the fish stick is being pushed through a workspace (e.g., behind a wall or under a ceiling), twisting and maneuvering can cause the individual segments to partially unscrew from one another, weakening the connection and sometimes causing the connectors to break or snap. Additionally, the areas where fish sticks are used are typically poorly lit.

SUMMARY OF THE INVENTION

Rods, commonly referred to as fish sticks, are used to route cables and other items in hard to reach places, such as behind walls. The rods can include multiple components to provide for a relatively easy mechanism to adjust the length of the rod. The rod can include a light emitting component that provides some illumination while the rod is being manipulated through areas that can be poorly lit.

One embodiment of a fish stick includes a rod and a lighted tip that are releasably coupled to each other and axially aligned. The lighted tip includes a housing, a light transmission end that is opposite where it is attached to the rod, and a light emitting source, such as an LED (light emitting diode). The lighted tip includes a cylindrical bore with a longitudinal axis aligned with the lighted component. The lighted tip also includes a curved lens that redirects light emitted by the light emitting source around the cylindrical bore and out the longitudinal end of the fish stick. The lighted tip also includes a light emission wall that is generally perpendicular to the longitudinal axis of the lighted tip. The light emission wall extends radially around the cylindrical bore. The curved lens is located between the light emission wall and the light emission source. The cylindrical bore optionally extends past the light transmission end of the lighted tip's housing.

In another embodiment, the fish stick includes a plurality of rod sub-components and at least some of the rods are made of a phosphorescent material and include an indicia of the stiffness of the rod. For example, the color of the light emitted by the phosphorescent material may indicate the stiffness or flexibility of that individual rod.

In another embodiment, the fish stick includes a plurality of rod sub-components that are threadably engaged together. At least some of the rods include a biasing element, such as a spring, that exerts a compressive force on the threadable engagement between the rods. As a result, the coefficient of friction to threadably disengage the rods is increased and therefore the rods are more likely to resist accidentally disengaging.

In another embodiment, a fish stick for routing cables inside a wall includes a rod and a lighted component coupled to a first end of the rod. The lighted component includes a housing and a light transmission end with a cylindrical bore. The cylindrical bore extends away from the rod. The lighted component also includes an LED and a curved lens that redirects light emitted by the LED around the cylindrical bore out the front of the fish stick.

Other features and aspects of the disclosure will become apparent by consideration of the following detailed description and accompanying drawings.

BRIEF DESCRIPTION OF THE DRAWINGS

FIG. 8 is a cross-sectional view of a container for holding a plurality of fish sticks, according to an embodiment.

FIG. 9 is a cross-sectional view of a container for holding a plurality of fish sticks, according to an embodiment.

FIG. 18 is a cross-sectional view of two of the fish sticks of FIG. 16 coupled together, with a collar in a first position, according to an embodiment.

FIG. 19 is a cross-sectional view of two of the fish sticks of FIG. 16 coupled together, with a collar in a second position, according to an embodiment.

FIG. 20 is a perspective view of another embodiment of two fish sticks coupled together, with a collar in a second position, according to an embodiment.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Fish sticks are used for running wire through walls, attics, floors, suspended ceilings, and cable trays. Fish sticks are commonly used in areas with poor or non-existent lighting. The fish sticks provided herein provide light for the user to facilitate their use in these poorly-lit areas.

In one embodiment, the fish stick includes a light emitting component, such as a lighted tip, near the leading end of the fish stick. The lighted tip receives an attachment piece at the end of the fish stick to hold the wire being run and is configured to direct light around the attachment piece at the end of the fish stick.

In another embodiment, the fish stick is made of a phosphorescent material and is stored in a container that charges the phosphorescent material to constantly be in condition for use. The container may include a light emitting component, such as an LED and reflective internal surfaces so that the rods of the fish stick are constantly absorbing energy from the LED. As a result, when the fish stick is assembled the rods emit phosphorescent light without requiring a charging period.

In another embodiment, the fish stick is made of multiple rods that are threadably engaged with each other. The rods include a spring biasing element that increases the coefficient of friction between the rods, reducing the likelihood of the rods accidentally disengaging from each other while the fish stick is being manipulated.

In another embodiment, the fish stick is made of multiple rods that are threadably engaged with each other via collars. The rods include two threaded surfaces that are outwardly-facing. The rods also include a collar with an inwardly-facing threaded surface that engages one of the outwardly-facing threaded surfaces. The rods also include an end with a protrusion and an end with a bore configured to receive the protrusion. When connected, a first rod's protrusion is placed within a second rod's bore, and the second rod's collar is rotated to engage both the first threaded surface of the first rod and the second threaded surface of the second rod at the same time, thus securing the engagement between the first and second rods.

Figure 1:
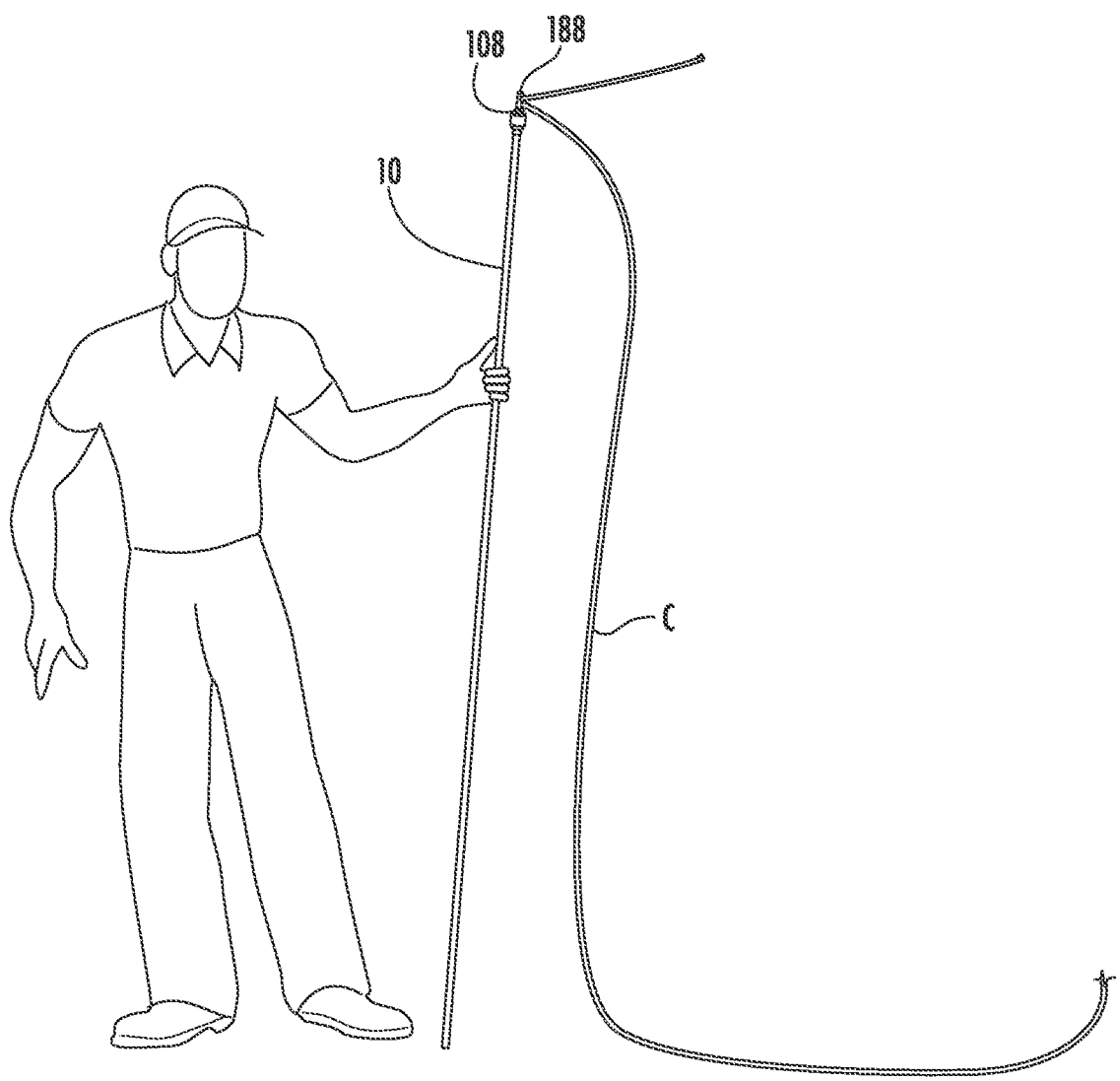
FIG. 1 is a perspective view of a user holding a fish stick, according to an embodiment.
Figure 2:
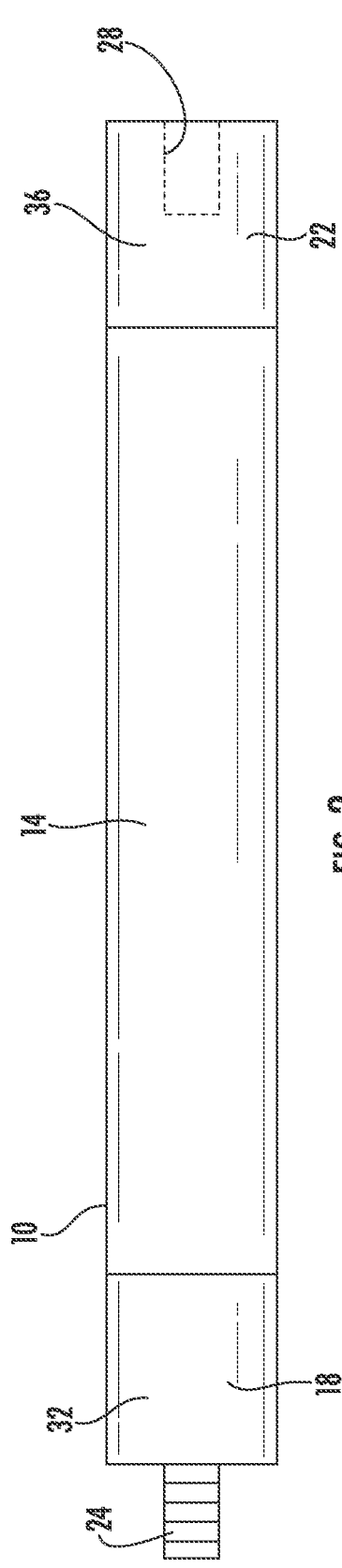
FIG. 2 is a plan view of a fish stick, according to an embodiment.

In FIGS. 1-2, a worker is holding a fish stick 10 to drag cable C behind walls. Fish stick 10 includes lighted tip 108 and attachment piece 188. Fish stick 10 includes a body portion 14, a first end 18, and an opposite second end 22. The first end 18 has male threads 24 and the second end has female threads 28. Threads 24, 28 are preferably comprised of metal. The first end 18 and the second end 22 include stiffness indicia 32, 36 to indicate the stiffness of the body portion 14. In various embodiments, there may only be stiffness indicia 32 on the first end 18, only be stiffness indicia 36 on the second end 22, or both ends 18, 22 may include stiffness indicia 32, 36. In some embodiments, the stiffness indicia 32, 36 are different colors to indicate the different stiffness ratings of the body portion 14. For example, red may be used to indicate high stiffness, yellow to indicate medium stiffness, and blue to indicate low stiffness (i.e., high flexibility).

In some embodiments, the body portion 14 comprises a phosphorescent material (e.g., in a fiberglass resin included in body portion 14), allowing the fish stick 10 to glow in the dark. In embodiments where only the first end 18 has stiffness indicia 32, the phosphorescent material of the body portion 14 may extend to the second end 22, such that the second end 22 is phosphorescent instead of having stiffness indicia 36. Similarly, in embodiments where only the second end 22 has stiffness indicia 36, the phosphorescent material of the body portion 14 may extend to the first end 18, such that the first end 18 is phosphorescent instead of having stiffness indicia 32. Traditional phosphorescent fish sticks do not have stiffness indicators. However, the described phosphorescent fish stick 10 allows an operator to easily discern the stiffness of a certain fish stick 10 by quickly glancing at the stiffness indicia 32, 26. In some embodiments, the body portion 14 of the fish stick 10 may include a reflective surface, as will be described later herein.

In other embodiments, body portion 14 is at least partially wrapped (not shown) in a material (e.g., a sticker) that is made of a phosphorescent material. In these embodiments, body portion 14 itself may optionally also be made of a phosphorescent material. In still other embodiments, body portion 14 is at least partially wrapped in a material that protects users from body portion 14 breaking (e.g., from fiberglass splinters if body portion 14 comprises fiberglass and it is snapped).

Figure 3:
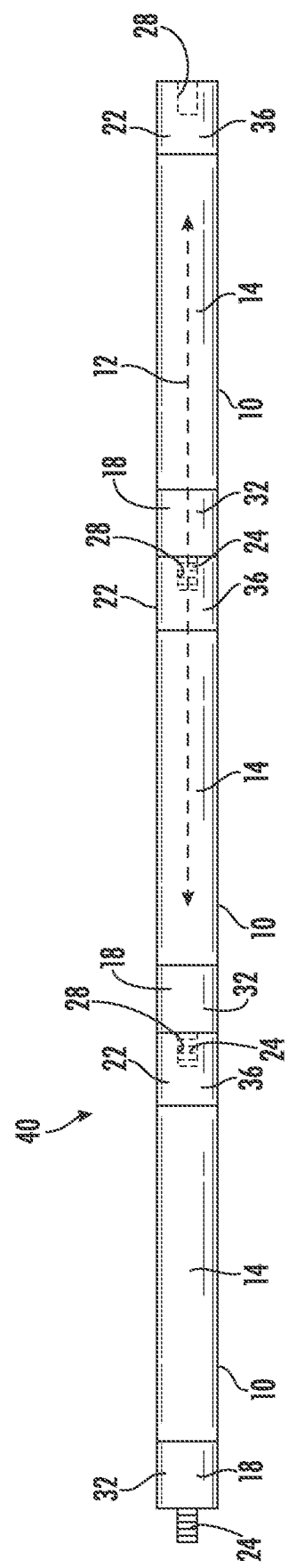
FIG. 3 is a plan view of a plurality of the fish sticks of FIG. 2 coupled together, according to an embodiment.

As shown in FIG. 3, a plurality of fish sticks 10 may be linked together by consecutively mating the male threads 24 of fish sticks 10 with female threads 28 of adjacent fish sticks 10. This consecutive linking arrangement 40 allows an operator to easily discern the stiffness of each individual fish stick 10 in the linked arrangement 40. In the linked arrangement 40, the first and second ends 18, 22 with stiffness indicia 32, 36 separate the phosphorescent body portions 14 of each fish stick 10 and, thus, allow the operator to easily count the number of body portions 14, and, thus, the number of fish sticks 10 in line.

Figure 4:
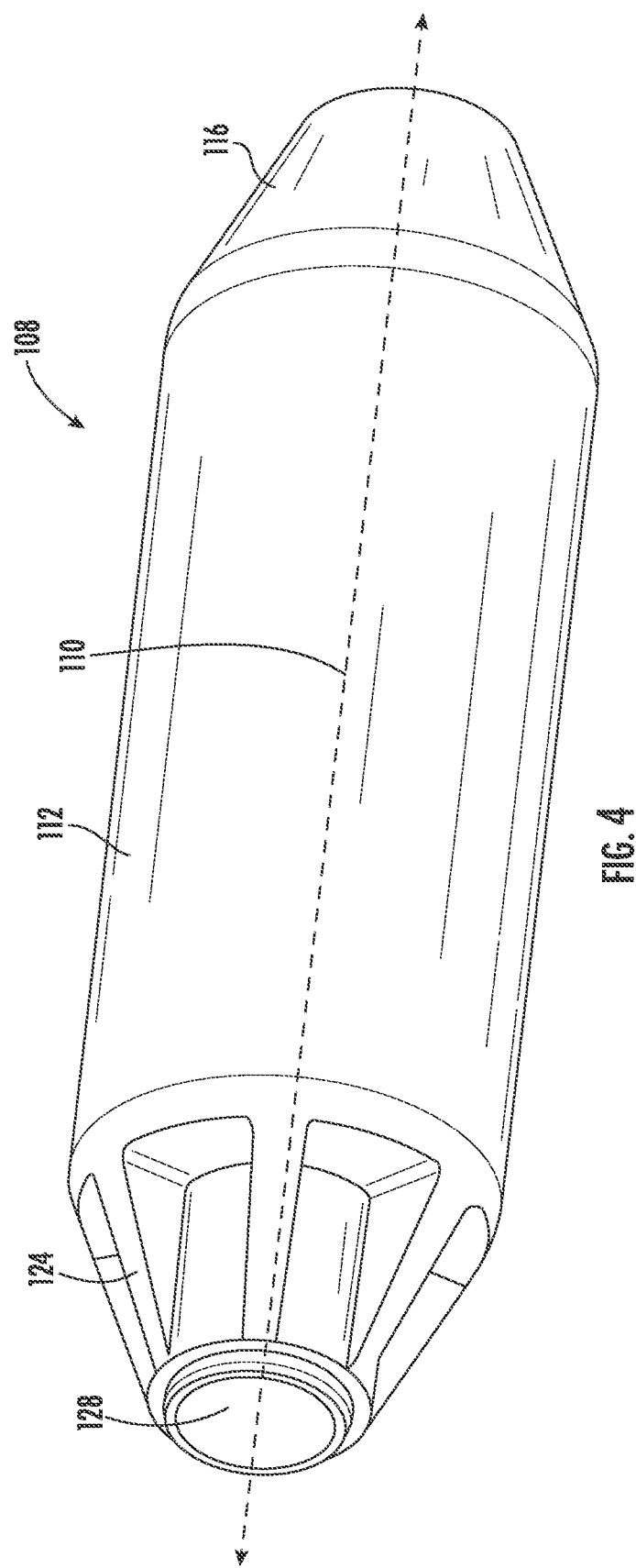
FIG. 4 is a perspective view of a lighted tip for use with the fish stick of FIG. 2, according to an embodiment.
Figure 5:
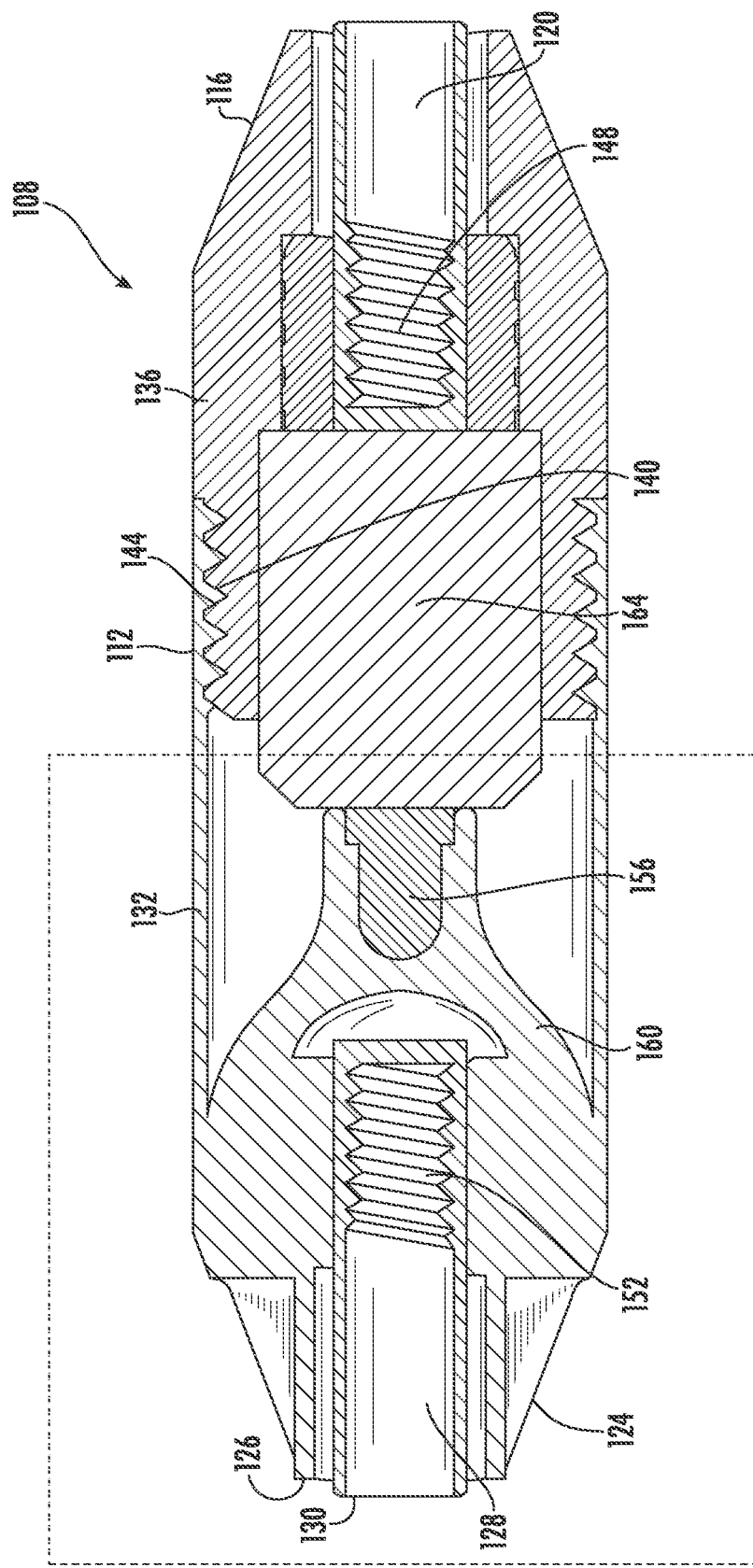
FIG. 5 is a cross-sectional view of the lighted tip of FIG. 4, according to an embodiment.
Figure 6:
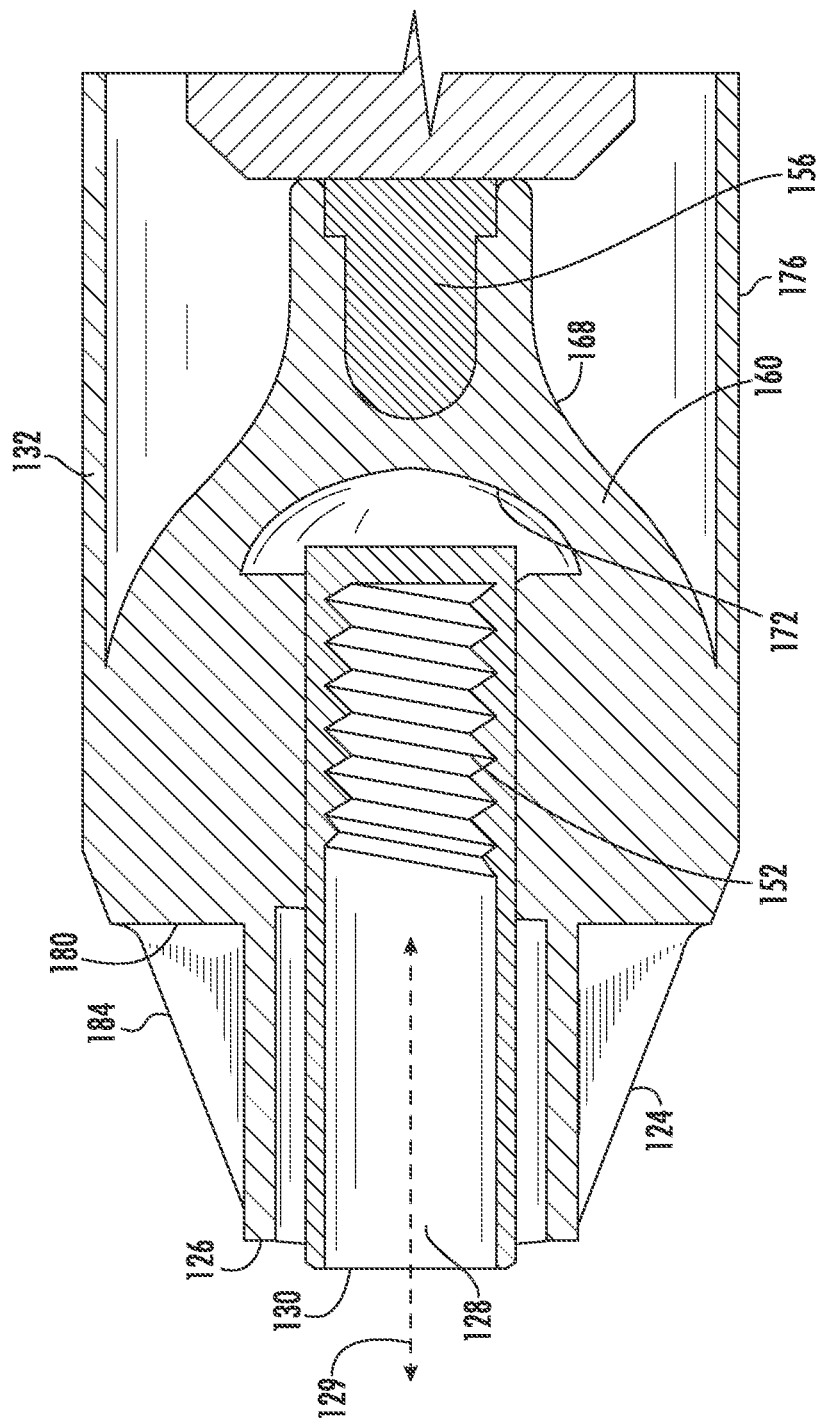
FIG. 6 is a detailed cross-sectional view of the lighted tip of FIG. 4, according to an embodiment.
Figure 7:
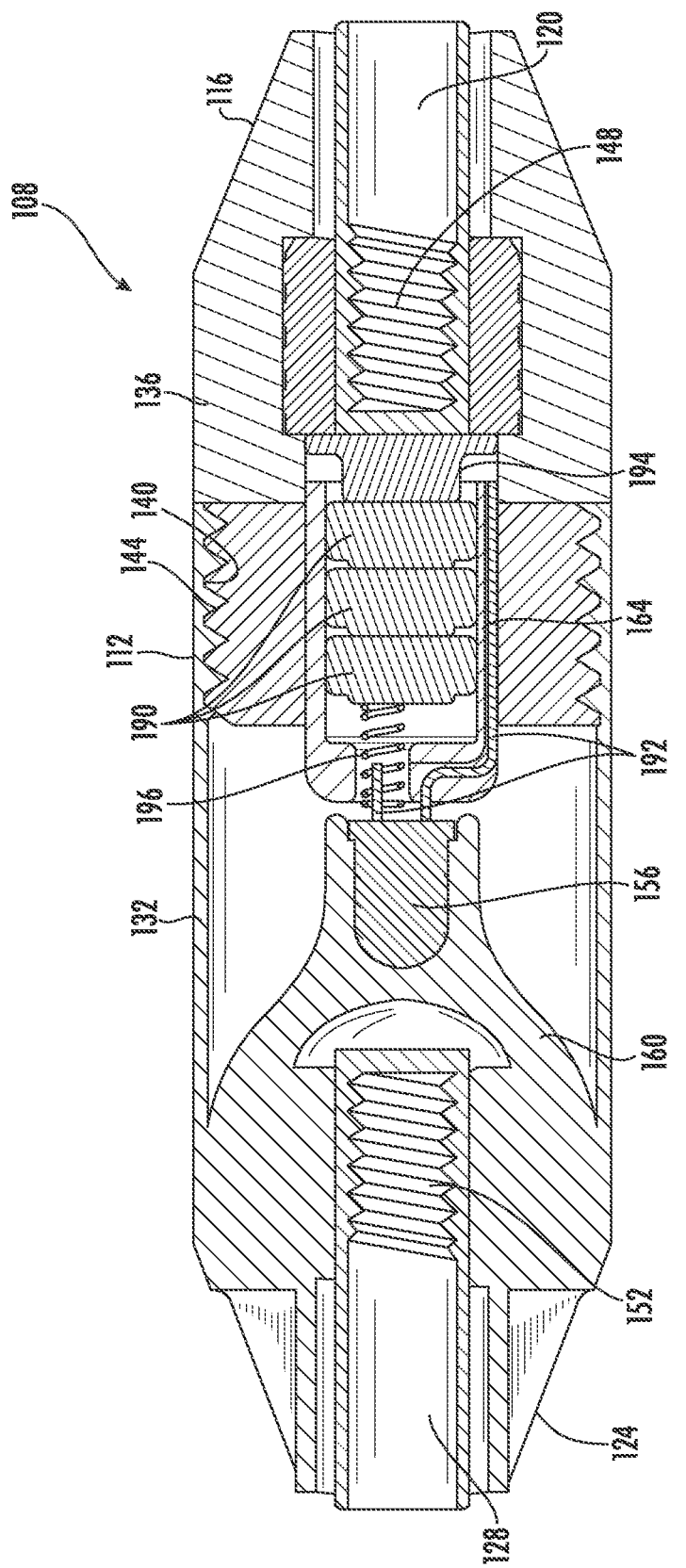
FIG. 7 is a cross-sectional view of a lighted tip of a fish stick, according to an embodiment.

As shown in FIGS. 4-7, a lighted tip 108 may be attached to the fish stick 10, as described below. The lighted tip 108 includes a housing 112 made of transparent plastic with an attachment end 116 having a cylindrical bore 120 and a light transmission end 124 with a cylindrical bore 128. As shown in FIGS. 5-6, the housing 112 is made of two pieces 132, 136 that are secured together via respective threads 140, 144. Metal female threads 148 are located in the cylindrical bore 120 of the attachment end 116 and female threads 152 are located in the cylindrical bore 128 of the light transmission end 124.

The lighted tip 108 includes a light source such as an LED 156, which transmits light out of the lighted tip 108 in the direction of the light transmission end 124 via a curved lens 160. Curved lens 160 comprises outer surface 168 and inner surface 172. Inner surface 172 axially surrounds and generally faces towards the primary longitudinal axis 12 of rod 10, shown as a fish stick, and outer surface 168 generally extends from LED 156 to outer wall 176 of piece 132 and generally faces away from inner surface 172.

In one embodiment, at least a portion of inner surface 172 is arcuate-shaped and centered around primary longitudinal axis 12 of rod 10. At least a portion of outer surface 168 is arcuate-shaped and centered around primary longitudinal axis 12 of rod 10. As a result of the respective curves of inner surface 172 and outer surface 168, at least a portion of light emitted from LED 156 towards outer wall 176 through curved lens 160 is refracted from its original path towards light transmission end 124.

Light emitted from LED 156 towards curved lens 160 curves, such as via refraction, around and through curved lens 160, and out light emission wall 180, which is generally perpendicular to longitudinal axis 12 of rod 10, longitudinal axis 110 of lighted tip 108, and longitudinal axis 129 of bore 128. Trusses 184 extend diagonally from end 126 of first piece 132 to light emission wall 180, providing structural support to both. In one embodiment, bore 128 is made of an opaque material, such as a metal alloy, and end 130 of bore 128 extends past end 126 of piece 132.

In other embodiments, lens 160 may have one or more flat sides and/or reflective material to redirect light towards light transmission end 124. For example, outer surface 168 and inner surface 172 may have flat portions (i.e., non-curved portions). In these embodiments, lens 160 may include a reflective material (e.g., on outer surface 168), to redirect light from LED 156 towards light transmission end 124.

Because the housing 112 is made of transparent plastic, the housing 112 also transmits light in directions besides towards the light transmission end 124. The LED 156 is powered by batteries 190. The LED 156 and batteries 190 are connected via circuit wire 192 and circuit toggle 194 when rod 10 is inserted into bore 128, forcing circuit toggle 194 towards light unit sidewall 164 and closing the circuit with circuit wire 192. When rod 10 is absent from bore 128, spring 196 biases batteries 190 and circuit toggle 194 away from circuit wire 192, thus opening the circuit and disengaging power to LED 156.

The LED 156 and/or batteries 190 are electrically connected to a circuit that includes the metal female threads 148 of the attachment end 116. When mating metal threads, such as male threads 24 of fish stick 10, threadably mate with the metal female threads 148 of the attachment end 116, the circuit is completed and thereby powers on the LED 156.

In operation, a fish stick 10 with metal male threads 24 is threadably inserted into the cylindrical bore 120. As shown in FIGS. 4-7, the attachment end 116 is tapered to provide a smooth transition between the lighted tip 108 and the fish stick 10. When the metal male threads 24 threadably mate with the metal female threads 148, the circuit is completed, thereby turning on the LED 156. The LED 156 now transmits light through lens 160 and housing 112 to illuminate the lighted tip 108 and an area in front of the light transmission end 124. The fish stick 10 may be removed to break/open the circuit and thereby turn off the LED 156 as soon as threads 24 of fish stick 10 cease contact with the metal female threads 148.

Alternatively, while the fish stick 10 is still attached to the attachment end 116 and the LED 156 is turned on, a second fish stick 10 with male threads 24 may be inserted into the cylindrical bore 128 of the light transmission end 124, and connected to the lighted tip 108 via threads 24, 152. As shown in FIGS. 4 and 5, the light transmission end 124 is tapered to provide a smooth transition between the lighted tip 108 and the second fish stick 10. While the second fish stick 10 is attached, the light transmission end 124 of the lighted tip 108 is designed to evenly scatter light such that, even with the second fish stick 10 (or other attachment such as a wisk or hook) threadably mated with the light transmission end 124, the lighted tip 108 effectively transmits light in front of the light transmission end 124. In other words, the optics of the lighted tip 108 are configured to bend light around the attached second fish stick 10, to potentially illuminate an area contacted or surrounded by the second fish hook 10.

In the illustrated embodiment the threads 148, 152 of the lighted tip 108 are female but in alternative embodiments, the cylindrical bores 120, 128 can be omitted and instead of female threads 148, 152, protrusions can extend from ends 116, 124 with male threads that are configured to threadably mate with the female threads 28 of fish stick 10, completing/closing the circuit in the same manner as described above to turn on the LED 156. In still other embodiments, threads 148, 152 of the lighted tip 108 are male and threadably engage with corresponding female threads.

As shown in FIGS. 8 and 9, a container 44 may be provided to hold a plurality of fish sticks 10. The container 44 includes an ultraviolet light (UV) 48. In the illustrated embodiment, the UV light 48 is fixed to an internal surface 52 of the container 44, but in other embodiments, the UV light 48 is separate from the internal surface 52 and is simply placed within the container 44.

Traditionally, operators store fish sticks in dark places, such as a truck, a box, or a bag. Thus, before the operator can use phosphorescent fish sticks, the operator must take the fish sticks out of the dark storage and put them under light, such as sunlight, and wait for the phosphorescent material to absorb the light energy, which is inconvenient and time consuming. However, when a plurality of fish sticks 10 are stored in the container 44, the phosphorescent body portions 14 of the fish sticks 10 store energy absorbed from the UV light 48. Then, when the fish sticks 10 are subsequently removed from the container 44 and used in a dark work area by the operator, the body portions 14 emit the stored energy in a form of visible light. Thus, when using the container 44, the operator does not need to wait when ready to use the fish stick 10 with phosphorescent body portion 14. Rather, the operator may simply take the fish stick 10 out of the container 44 and immediately use the fish stick 10 in a dark work area. The UV light 48 may also charge the phosphorescent body portion 14 faster than traditional methods, such as sunlight, because the UV light 48 is more concentrated.

In some embodiments, the internal surface 52 is comprised of a reflective material to reflect the light from the UV light 48 within the container 44. In such embodiments, each of the fish sticks 10 is able to absorb the UV light more easily, because the reflective material of the internal surface 52 disperses the light from the UV light more evenly and completely. In some embodiments, as described above, the body portions 14 of the fish sticks 10 may include reflective surfaces to more evenly disperse the light from the UV light 48 to fish sticks 10 that are bunched together.

In some embodiments, the storage container 44 is a tube 56 with a fixed bottom 60 and a removable cover 64. In some embodiments, the cover 64 can be a cap that is attached to the tube 56 via a lanyard 68. The cover 64 includes an internal surface 72 with means such as hooks 76 for attaching fish stick tips 80, such as lighted tips. Thus, as shown in FIG. 9, an operator may store tips 80 in the cover 64. In other embodiments, the storage container 44 may be a soft case or a box, such as a tool box.

In some embodiments, as shown in FIG. 8, the container 44 can include threads 84 on an outside surface 88 that interact with threads 92 of a storage piece 96 that is removably attached to the container 44. Thus, as shown in FIG. 9, the storage piece 96 can store fish tip accessories 100, such as tips 80 or thread adapters when attached to container 44. However, as shown in FIG. 8, even when the storage piece 96 is removed from the container 44, the fixed bottom 60 still functions as a closed surface to contain the fish sticks 10 stored within the container 44.

In some embodiments, one or more separators 104, such as ribs or discs with holes, can be used to prevent the fish sticks 10 from resting on one another and/or the storage container 44. In some embodiments, the separators 104 are included on the fixed bottom 60. When the fish sticks 10 are stored in the container 44, the separators 104 allow the light from the UV light 48 to more evenly and completely strike the phosphorescent body portions 14 of the fish sticks 10 in the container 44.

Figure 10:
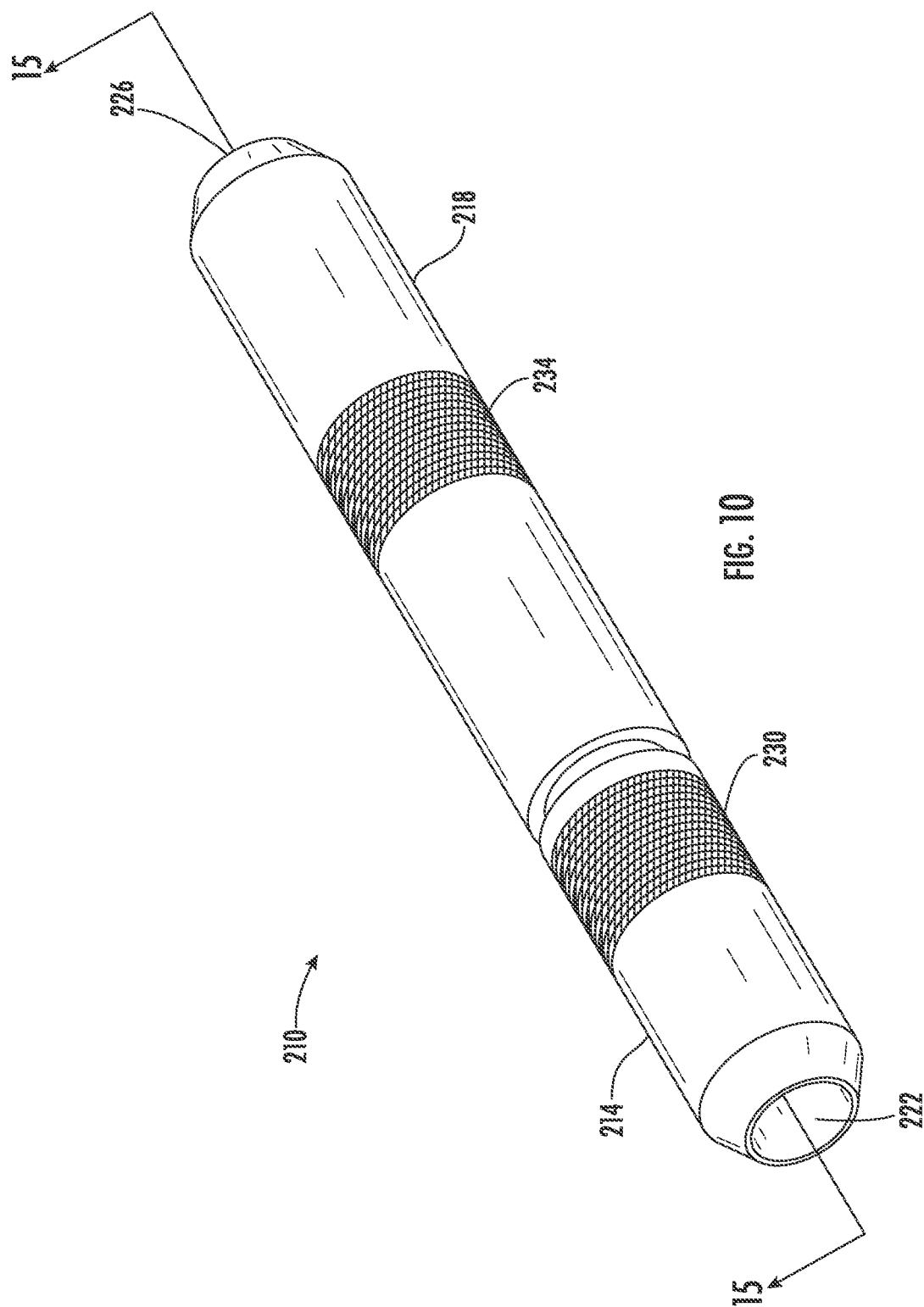
FIG. 10 is a perspective view of a rod connector, according to an embodiment.

FIG. 10 illustrates a rod connector 210 that includes a male connector 214 and a female connector 218. The rod connector 210 includes a male grip portion 230 located on the male connector 214, and a female grip portion 234 located on the female connector 218. The male and female grip portions 230, 234 are graspable by an operator to maneuver or twist the male and female connectors 214, 218 respectively.

Figure 13:
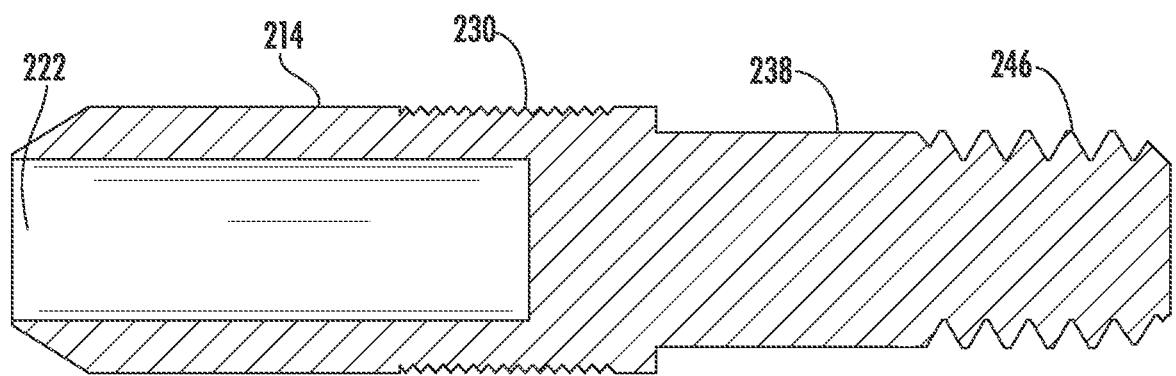
FIG. 13 is a cross-sectional view of a male connector of the rod connector of FIG. 10, taken along line 13 of FIG. 11, according to an embodiment.

The rod connector 210 further includes rod bores 222 and 226, each configured to receive an end portion of one or more elongated rod segments. Specifically, the male connector 214 includes a first rod bore 222 (FIG. 13) located opposite a male stud 238, and the female connector 218 includes a second rod bore 226 (FIG. 14) located opposite a female bore 242. The rod bores 222 and 226 can be elongated apertures having a shape and dimension that permits an end portion of each elongated rod segment to fit snugly within each rod bore 222 and 226. The end portions of the rod segments can be secured within the rod bores 222 and 226 by adhesive, by press fit, by fasteners, or by any other securing means sufficient to keep the male and female connectors 214, 218 affixed to the end portions of the rod segments.

The male and female connectors 214, 218 can also include chamfers 224 located adjacent the first and second rod bores 222, 226 respectively. The chamfers 224 provide a smooth transition between the outer surfaces of the rod segments and the rod connector 210, allowing an assembled rod to slide smoothly past obstacles during operation.

Figure 11:
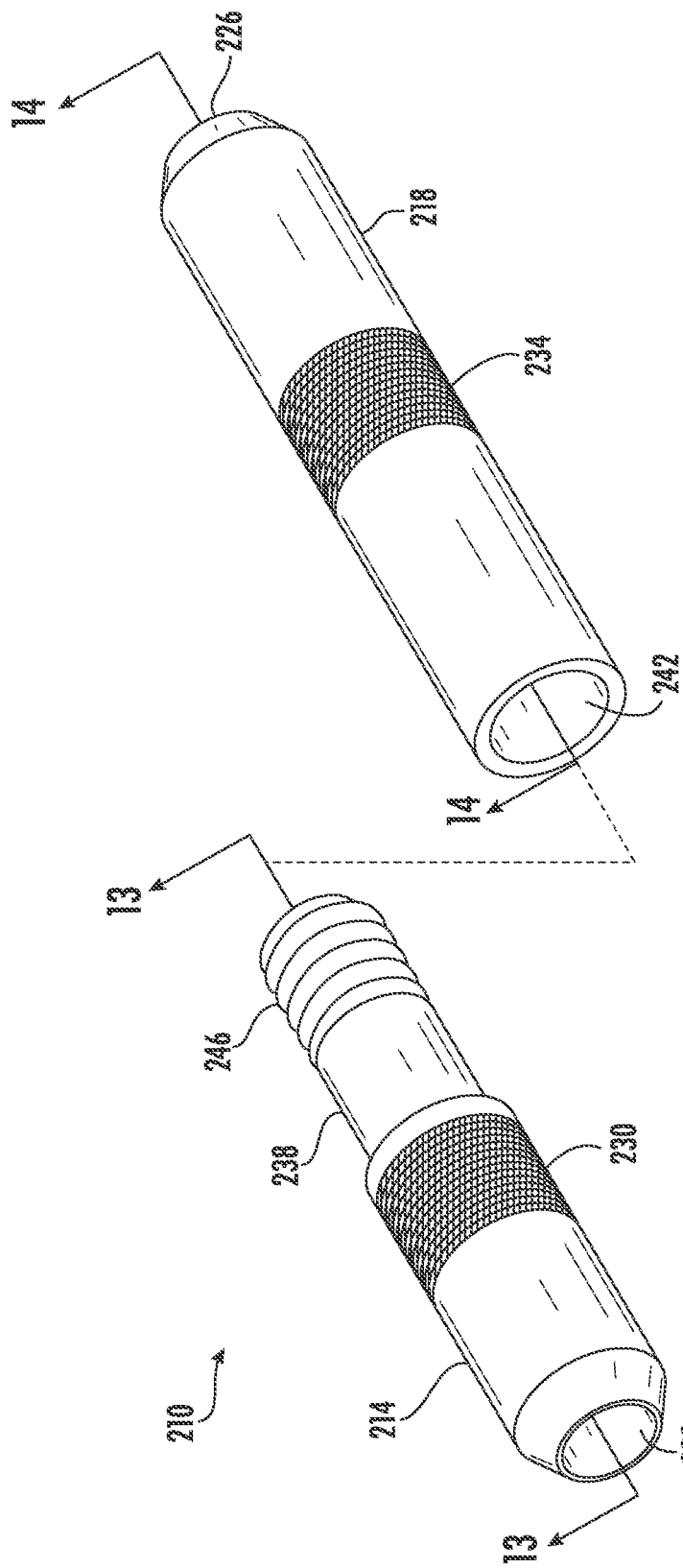
FIG. 11 is a partially exploded view of the rod connector of FIG. 10, according to an embodiment.

With reference to FIG. 11, the male connector 214 includes a male threaded portion 246 located on the male stud 238. Likewise, the female connector 218 includes a female threaded portion 250 (FIG. 14) located inside the female bore 242, and corresponding to the male threaded portion 246 of the male connector 214. The male connector 214 can be coupled to the female connector 218 by inserting the male stud 238 into the female bore 242, and twisting the male connector 214 relative to the female connector 218 to engage the male threaded portion 246 with the female threaded portion 250.

Figure 12:
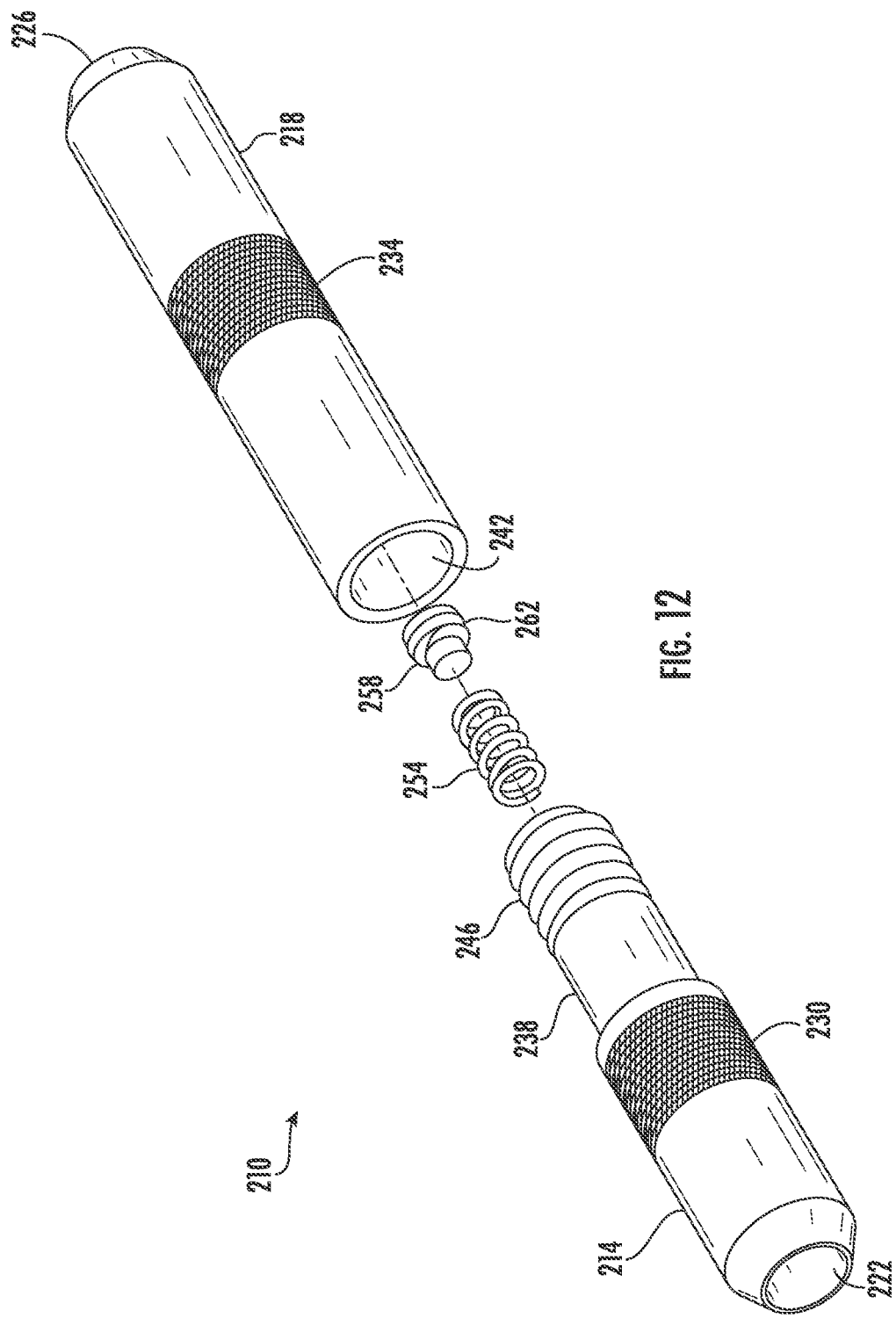
FIG. 12 is an exploded view of the rod connector of FIG. 10, according to an embodiment.
Figure 14:
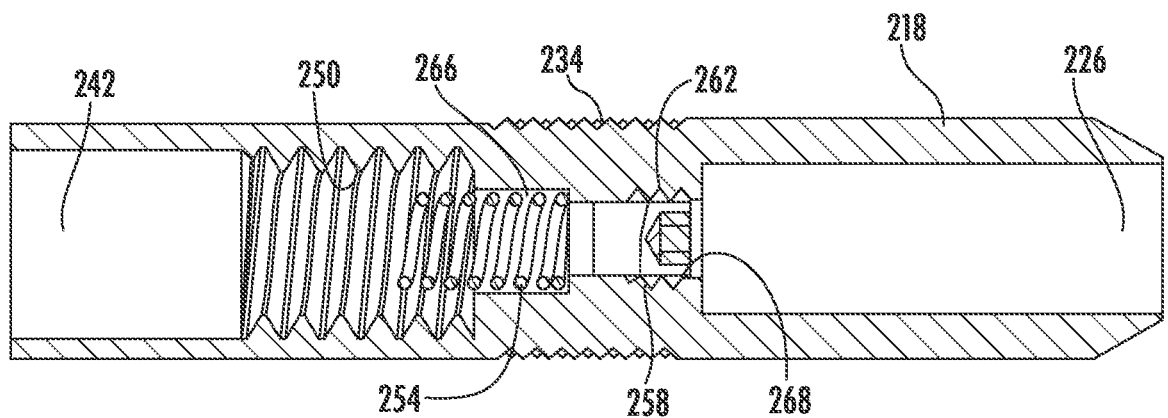
FIG. 14 is a cross-sectional view of a female connector of the rod connector of FIG. 10, taken along line 14 of FIG. 11, according to an embodiment.
Figure 15:
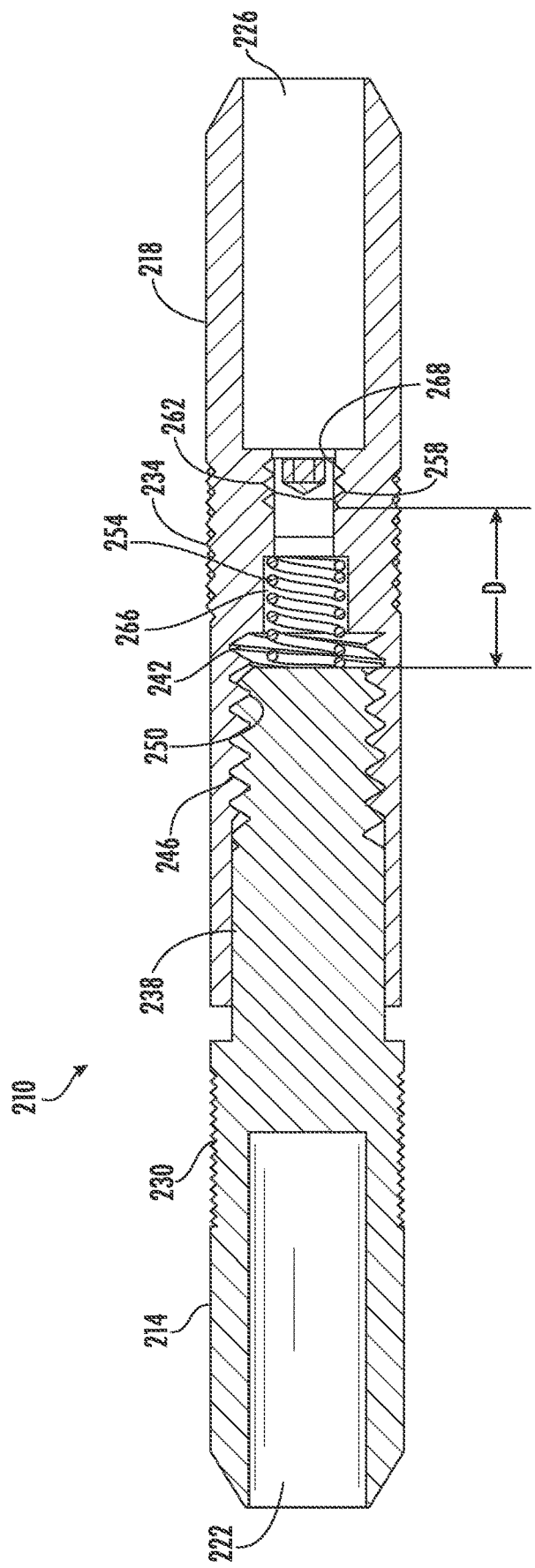
FIG. 15 is a cross-sectional view of the rod connector of FIG. 10, taken along line 15 of FIG. 10, according to an embodiment.

With reference to FIGS. 12 and 14-15, the rod connector 210 also includes a biasing member 254 disposed within the female connector 218. The biasing member 254 is depicted as a coil spring in FIG. 12; however, in other constructions, the biasing member 254 can be a flat spring, a disc spring, or any other type of biasing member capable of exerting a compressive force. The biasing member 254 is oriented axially within a spring bore 266 (FIG. 14) located adjacent the female threaded portion 250 of the female bore 242. In some constructions, the rod connector 210 can also include a set screw 258 disposed within the female connector 218 and having set screw threads 262. In this construction, the female connector 218 can also include a spring bore threaded portion 268 located adjacent the second rod bore 226, and engaging the set screw threads 262 to retain the set screw 258 within the female connector 218. In this construction, the biasing member 254 can be pressed onto the end of the set screw 258 to secure the biasing member within the spring bore 266. In other constructions, the set screw 258 can be replaced with a permanent fixture (not shown) within the female connector 218.

In operation, when the male connector 214 is threaded into the female connector 218, the biasing member 254 contacts and exerts a compressive force against the male stud 238 (FIG. 15). This compressive force increases the friction between the male and female threaded portions 246 and 250 of the male and female connectors 214 and 218. The increased friction between the threaded portions 246 and 250 of the connectors 214 and 218 makes it more difficult to unscrew the male connector 214 from the female connector 218. The compressive force exerted by the biasing member 254 against the male stud 238 increases the magnitude of the twisting force required to overcome the increased friction between the threaded portions 246 and 250. This reduces the likelihood that the male and female connectors 214, 218 become inadvertently unscrewed from one another while the assembled rod segments are twisted or otherwise maneuvered during operation.

In some constructions, the magnitude of the compressive force exerted by the biasing member 254 against the male stud 238 can be adjusted by advancing or reversing the set screw 258. Specifically, by advancing the set screw 258 toward the female threaded portion 250 of the female bore 242, an axial distance D (FIG. 15) within which the biasing member 254 must compress is decreased, and the resulting force exerted by the biasing member 254 against the male stud 238 is increased. Conversely, by reversing the set screw away from the female threaded portion 250 of the female bore 242, an axial distance D within which the biasing member 254 must compress is increased, and the resulting force exerted by the biasing member 254 against the male stud 238 is decreased. In this manner, the amount of friction between the threaded portions 246 and 250 of the connectors 214 and 218 can be increased or decreased by adjusting the set screw 258. An operator can position the set screw in such a manner as to strike a balance between the difficulty of twisting the rod segments together, and the potential for obstacles to inadvertently unscrew the rod segments during operation, depending on the particular conditions of the application.

Figure 16:
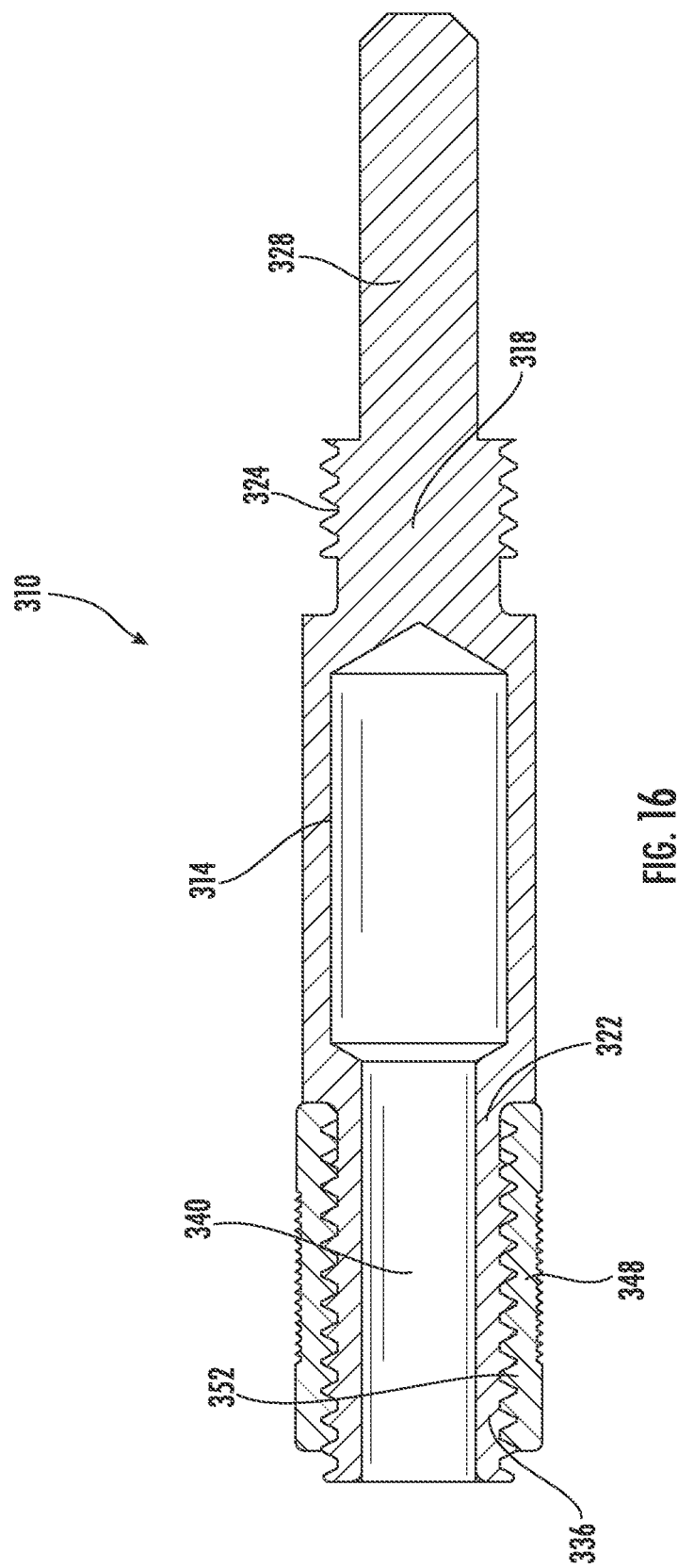
FIG. 16 is cross-sectional view of a fish stick, according to an embodiment.
Figure 17:
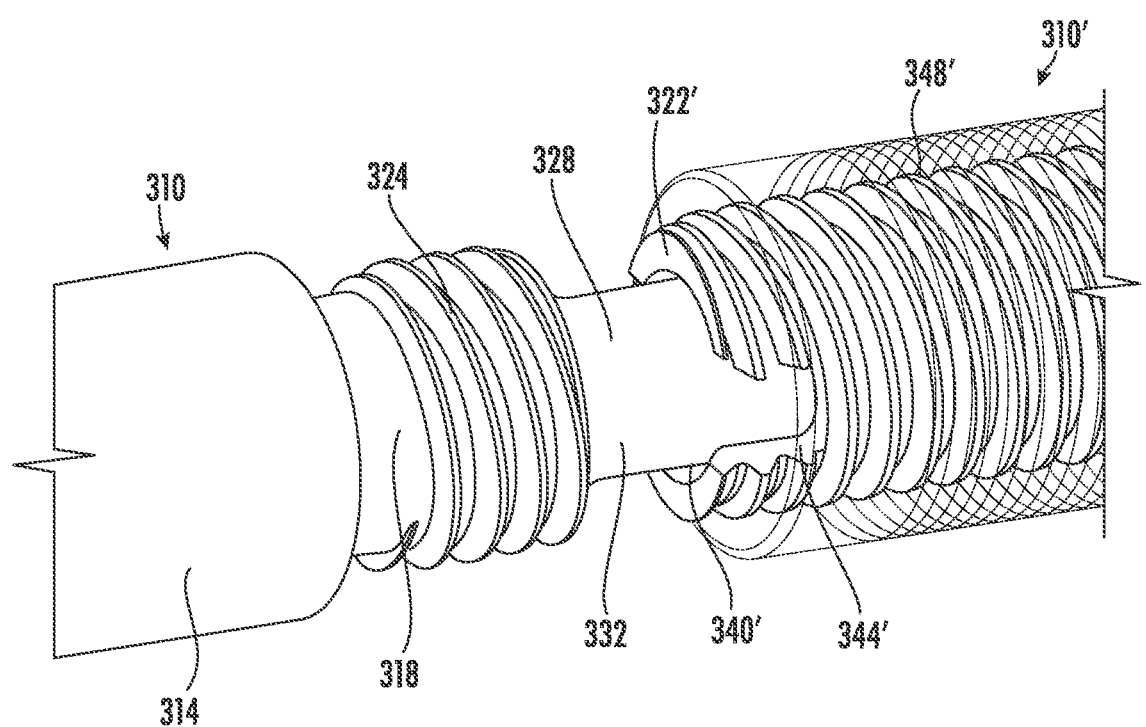
FIG. 17 is a perspective view of two of the fish sticks of FIG. 16 being coupled together, with a collar in a first position, according to an embodiment.

FIG. 16 illustrates a first fish stick 310 with a body 314, a first end 318, and an opposite second end 322. The first end 318 has a first threaded surface 324 and a protrusion 328. In an illustrative embodiment, the body 314 may include a rod comprised of fiberglass extending between the first end 318 and the second end 322. As shown in FIG. 17, a notch 332 extends radially outward from the protrusion 328. The second end 322 has a second threaded surface 336 and a recess 340. As shown in FIG. 17 by a second fish stick 310' that is identical to first fish stick 310, a slot 344' extends radially outward from the recess 340'. In the illustrated embodiment, the protrusion 328 is a cylindrical pin and the recess 340 is a cylindrical bore, but in other embodiments the protrusion 328 and recess 340 may take other shapes or forms. As shown in FIG. 16, a collar 348 is threadably arranged in a first position about the second threaded surface 336. Specifically, the collar 348 has a third threaded surface 352 that is threadably engaged with the second threaded surface 336.

As shown in FIGS. 17 and 18, the first fish stick 310 may be mated with a second fish stick 310' by inserting the protrusion 328 of the first fish stick 310 into the recess 340' of the second fish stick 310'. As shown in FIG. 17, the notch 332 must be rotationally aligned with the slot 344'. Otherwise, the recess 340' will not be able to receive the protrusion 328. Although the embodiments shown in FIGS. 17 and 18 show the notch 332 and the slot 344', in alternative embodiments, any other suitable shape may be used to rotationally secure the first fish stick 310 to the second fish stick 310'. For example, the notch 332 and the slot 344' may have a D shape, a crown shape, etc. Once the notch 332 is in the slot 344' and the protrusion 328 is in the recess 340', the first end 318 of the first fish stick 310 is mated with the second end 322' of the second fish stick 310'. At this point, the first end 318 of the first fish stick 310 is not rotatable with respect to the second fish stick 310' because arrangement of notch 332 in slot 344' prevents relative rotation between the first fish stick 310 and the second fish stick 310'. However, the first fish stick 310 and second fish stick 310' are still not secured together, because there is nothing to prevent the first end 318 from sliding axially out of the second end 322'.

Arrangement of notch 332 in slot 344' forces a specific rotational arrangement between the first end 318 and second end 322', in which the first threaded surface 324 of the first fish stick 310 is aligned with the second threaded surface 336' of the second fish stick 310', such that the first and second threaded surfaces 324, 336' form a continuous threaded surface. Thus, the collar 348' may be moved from the first position (FIG. 18) to a second position (FIG. 19), in which the collar 348' threadably engages both the first threaded surface 324 of the first fish stick 310 and the second threaded surface 336' of the second fish stick 310', such that the first fish stick 310 and second fish stick 310' are secured together. Specifically, the first fish stick 310 is now prevented from being axially removed from the second fish stick 310' because the third threaded surface 352' is threaded onto both the first threaded surface 324 and second threaded surface 336'. In other words, the collar 348' holds the first end 318 and second end 322' together in tension if the first fish stick 310 is attempted to be pulled from the second fish stick 310'.

Further, the first end 318 of the first fish stick 310 is prevented from rotating off the second end 322' of the second fish stick 310', with the collar 348' coupled to the first threaded surface 324, because arrangement of notch 332 in slot 344' prevents relative rotation between the first end 318 and second end 322'. The collar 348' also provides additional strength between the first end 318 and second end 322' when the first fish stick 310 is bent with respect to the second fish stick 310'. If a user desires to separate the fish and second sticks 310, 310', the user simply moves the collar 348' from the second position back to the first position, in which the collar 348' is only engaged with the second threaded surface 336' of the second fish stick 310'. The user may now slide the first end 318 out of the second end 322'.

In the illustrated embodiment, the first fish stick 310 and second fish stick 310' are identical, but in other embodiments, the first fish stick 310 may have the first end 318 with the first threaded surface 324, protrusion 328 and notch 332, but the second end 322 may include different structure instead of the second threaded surface 336, recess 340 and slot 344. For instance, the second end 322 may include a whisk or hook (not shown). Likewise, in other embodiments, the second fish stick 310' may have the second end 322' with the second threaded surface 336', recess 340' and slot 344' but the first end 318' may include different structure instead of the first threaded surface 324', protrusion 328' and notch 332.' For instance, the first end 318' may include a whisk or hook (not shown). In other words, the second end 322 of the first fish stick 310 does not need to be identical to the second end 322' of the second fish stick 310' and the first end 318' of the second fish stick 310' does not need to be identical to the first end 318 of the first fish stick 310, as shown in FIG. 20.

Although the disclosure has been described in detail with reference to certain preferred embodiments, variations and modifications exist within the scope and spirit of one or more independent aspects of the disclosure as described It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A lighted tip component for a fish stick, the lighted tip component comprising:
a longitudinal axis;
a housing;

a light transmission end comprising a cylindrical bore, the cylindrical bore being configured to receive and couple to a fish stick rod;
a light emitting source; and
a curved lens coupled to the cylindrical bore, the curved lens redirects light emitted by the light emitting source around the cylindrical bore.

2. The lighted tip component of claim 1, the lighted tip component further comprising:
a light emission wall that is generally perpendicular to the longitudinal axis, the curved lens located between the light emission wall and the light emitting source.

3. The lighted tip component of claim 2, the lighted tip component further comprising:
a plurality of support trusses fixedly coupled to the light emission wall and the cylindrical bore.

4. The lighted tip component of claim 1, the curved lens comprising:
an inner surface, at least a portion of which is arcuate-shaped around the longitudinal axis; and
an outer surface, at least a portion of which is arcuate-shaped around the longitudinal axis.

5. The lighted tip component of claim 1, further comprising an attachment end, the attachment end comprising a second cylindrical bore configured to receive and couple to a fish stick rod.

6. The lighted tip component of claim 5, further comprising:
a power source coupled to the light emitting source by a circuit wire;
a biasing component positioned between the light emitting source and the power source; and
a circuit toggle positioned between the power source and the second cylindrical bore.

7. The lighted tip component of claim 6, wherein, when the fish stick rod is inserted in the second cylindrical bore, the biasing component biases the power source and circuit toggle toward from the circuit wire such that power from the power source to the light emitting source is engaged and wherein, when the fish stick rod is absent from the second cylindrical bore, the biasing component biases the power source and circuit toggle away from the circuit wire such that power from the power source to the light emitting source is disengaged.

8. The lighted tip component of claim 1, the curved lens further comprising a curved inner surface and a curved outer surface, the curved inner surface extending around and facing towards the cylindrical bore, and wherein the curved inner surface is concave relative to the cylindrical bore.

9. A lighted tip comprising:
a housing;
a longitudinal axis;
an attachment end, the attachment end comprising a first cylindrical bore configured to receive and couple to a fish stick rod; and
a light transmission end opposing the attachment end, the light transmission end comprising:
a second cylindrical bore, the second cylindrical bore aligned with the first cylindrical bore along the longitudinal axis;
a light emitting source; and
a lens positioned within the housing and coupled to the second cylindrical bore such that the lens axially surrounds the longitudinal axis and redirects light emitted by the light emitting source around the second cylindrical bore.

10. The lighted tip of claim 9, further comprising a light emission wall extending in a perpendicular direction to the longitudinal axis and radially outward from the second cylindrical bore, the light emission wall positioned between a first end of the second cylindrical bore and a second end of the second cylindrical bore.

11. The lighted tip of claim 10, wherein the light emission wall extends from an outer surface of the second cylindrical bore to an outer surface of the housing of the lighted tip.

12. The lighted tip of claim 9, wherein the lens includes one or more flat sides configured to redirect light toward the light transmission end.

13. The lighted tip of claim 9, wherein the lens comprises reflective material to redirect light toward the light transmission end.

14. The lighted tip of claim 9, wherein the first cylindrical bore includes a first set of female threads and the second cylindrical bore includes a second set of female threads.

15. The lighted tip of claim 9, wherein the housing includes a first section and a second section and wherein the first section threadably couples to the second section of the housing.

16. The lighted tip of claim 9, wherein the lens is a curved lens including a curved inner surface, the curved inner surface extending around and facing towards the second cylindrical bore such that the curved inner surface is concave relative to the second cylindrical bore.

17. A lighted tip component comprising:
a housing;
an attachment end, the attachment end comprising a first cylindrical bore configured to receive and couple to a fish stick rod;
a light transmission end opposing the attachment end, the light transmission end comprising:
a second cylindrical bore, the second cylindrical bore comprising:
a first end; and
a second end opposing the first end;
wherein the first end of the second cylindrical bore includes an external opening and the second end of the second cylindrical bore includes a continuous end surface;
a light emitting source; and
a curved lens positioned within the housing and coupled to the second end of the second cylindrical bore such that the curved lens redirects light emitted by the light emitting source around the second cylindrical bore; and
a longitudinal axis extending from attachment end to the light transmission end, and a light emission wall extending in a perpendicular direction relative to the longitudinal axis;
wherein the light emission wall is positioned between the first end of the second cylindrical bore and the second end of the second cylindrical bore.

18. The lighted tip component of claim 17, further including a plurality of support trusses fixedly coupled to the light emission wall and the second cylindrical bore.

19. The lighted tip component of claim 17, wherein the first end of the second cylindrical bore extends past an end of the housing of the lighted tip component.

20. The lighted tip component of claim 17, wherein the housing is formed from a transparent plastic material such that light transmits in a plurality of directions including toward the light transmission end.

* * * * *